United States Patent
Wood

(10) Patent No.: US 6,745,456 B2
(45) Date of Patent: Jun. 8, 2004

(54) APPARATUS AND METHOD OF MAKING A ROTOR CORE WITH ELIMINATION OF OUTER PERIPHERY MACHINING

(75) Inventor: Redmond Wood, Spencerville, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/072,363

(22) Filed: Feb. 7, 2002

(65) Prior Publication Data

US 2003/0145451 A1 Aug. 7, 2003

(51) Int. Cl.⁷ .............................................. H02K 15/16
(52) U.S. Cl. .......................... 29/598; 29/596; 29/604; 310/216; 310/218
(58) Field of Search ......................... 29/596, 598, 597, 29/604, 607, 606, 732; 310/154, 156, 51, 254, 216, 217, 218

(56) References Cited

U.S. PATENT DOCUMENTS

| | | | |
|---|---|---|---|
| 1,762,017 A | * | 6/1930 | Grenzer ..................... 29/238 |
| 2,304,607 A | | 12/1942 | Sleeter |
| 2,493,102 A | | 1/1950 | Brainard |
| 3,584,345 A | | 6/1971 | Beastrom |
| 3,665,593 A | | 5/1972 | Savage |
| 3,683,493 A | * | 8/1972 | Begovich ..................... 29/598 |
| 3,685,142 A | | 8/1972 | Deming |
| 4,064,928 A | | 12/1977 | Wunder |
| 4,176,444 A | | 12/1979 | Walker |
| 4,267,719 A | | 5/1981 | Walker |
| 4,464,826 A | * | 8/1984 | Bair ............................. 29/593 |
| 4,885,496 A | * | 12/1989 | Wheeler ....................... 29/596 |
| 4,918,802 A | * | 4/1990 | Schaefer ....................... 29/598 |
| 5,174,009 A | * | 12/1992 | Martin ....................... 29/564.6 |

* cited by examiner

Primary Examiner—I Cuda Rosenbaum
Assistant Examiner—Stephen Kenny
(74) Attorney, Agent, or Firm—Michael & Best Friedrich LLP

(57) ABSTRACT

An apparatus and an associated method are utilized to make a rotor core. The apparatus includes a support for supporting a lamina stack that has an axis extending along the stack. The apparatus includes a plurality of collets. A collet moving mechanism moves the collets radially inward against the lamina stack. An arrangement receives casting material that is cast to the lamina stack while the collets are against the lamina stack.

9 Claims, 6 Drawing Sheets

APPARATUS AND METHOD OF MAKING A ROTOR CORE WITH ELIMINATION OF OUTER PERIPHERY MACHINING

TECHNICAL FIELD

The present invention is directed to the manufacture of a rotor core and is specifically directed to manufacture of a rotor core such that machining of an outer radial periphery of the rotor core is unnecessary.

BACKGROUND OF THE INVENTION

A rotor core for an electric induction motor may be made by various techniques. One particular technique for manufacturing a rotor core is a conventional die-cast apparatus. Rotor core laminations are provided as a lamina stack within the conventional die casting machine. The die is closed, and molten material (e.g., metal) is injected into the die to form conductor end rings and bar windings, or the like, in engagement with the lamina stack. Such conventional die casting results in excess molded metal being present after the casting is complete. In particular, excess molded metal is present on the arcuate outer radial periphery of the rotor core. Such excess metal may be present on the arcuate outer periphery of the lamina stack.

Such excess metal must be removed via machining, grinding, or the like. In one example, the removal of excess metal is associated with a manual labor input. Further, the machining, grinding, or the like must be accomplished such that the outside periphery of the rotor core maintains a required acceptable dimensional tolerance. Still further, the machining, grinding, or the like must be performed such that the electrical properties of the rotor core are not degraded. Accordingly, it is to be appreciated that improvements to the state of the art are possible.

SUMMARY OF THE INVENTION

In accordance with one aspect, the present invention provides an apparatus for making a rotor core. The apparatus includes a support for supporting a lamina stack that has an axis extending along the stack. The apparatus includes a plurality of collets. A collet moving mechanism moves the collets radially inward against the lamina stack. An arrangement receives casting material that is cast to the lamina stack while the collets are against the lamina stack.

In accordance with another aspect, the present invention provides a method of making a rotor core. A lamina stack that has an axis extending along the stack is supported. A plurality of collets is placed about a radially outer periphery of the lamina stack. The collets are moved radially inward against the lamina stack. Material is cast to the lamina stack while the collets are against the lamina stack.

BRIEF DESCRIPTION OF THE DRAWINGS

Further features and advantages of the present invention will become apparent to persons skilled in the art to which the present invention relates from reading the following description with reference to the accompanying drawings, in which.

DESCRIPTION OF EXAMPLE EMBODIMENT

Figure 1:
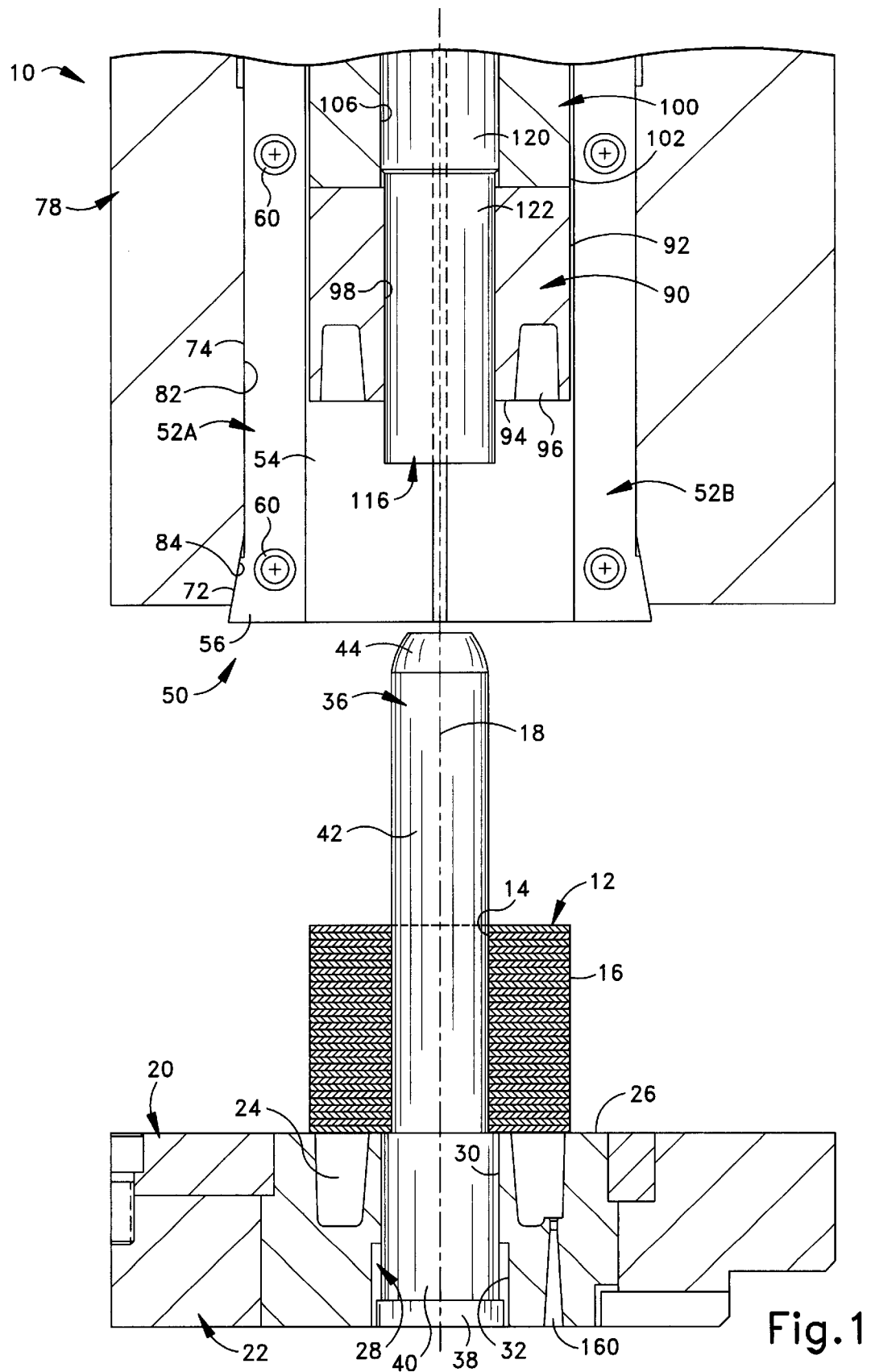
FIG. 1 is a fragmentary, cross-sectional view of an apparatus for making a rotor core in accordance with the present invention and shown in one position.

An example of an apparatus 10 for making a rotor core in accordance with the present invention is shown in FIG. 1. Also shown in FIG. 1 is a stack of rotor core laminations 12 in position within the apparatus 10 during an early process step in making the rotor core. The laminations 12 may have any suitable construction and configuration. Also, any suitable number of laminations may 12 be provided, each lamination may be made of a suitable material (e.g., steel) and each lamination may have any suitable structure (e.g., slots for conductor bars). Hereinafter, the plurality of laminations 12 is referred to collectively as the lamina stack 12.

In the illustrated example, each of the laminations, and thus the lamina stack 12 as a whole, has a circular inner bore 14 and a circular outer periphery 16. The surface of the bore 14 and the surface of the outer periphery 16 are concentric about an axis 18. As such, these surfaces of the lamina stack 12 are arcuate, radially-inner and radially-outer surfaces, respectfully.

The apparatus 10 includes a support assembly 20 onto which the lamina stack 12 is placed to begin a molding process in accordance with the present invention. In pertinent part, the support assembly 20 includes a lower die 22. An annular mold recess 24 of the lower die 22 extends in an axial direction from a support surface 26 of the lower die. The annular recess 24 extends concentrically about the axis 18.

A bore 28 extends through the lower die 22 along the axis 18. A first, upper portion 30 of the bore 28 is cylindrical and has a first radius. The first portion 30 is adjacent to the support surface 26 of the lower die 22. A second, lower portion 32 of the bore 28 has a radius that is greater than the radius of the first portion 30. The second portion 32 is located at the distal end of the bore 28, away from the support surface 26.

A pin member 36 extends through the bore 28 of the lower die 22 and extends a substantial distance upward along the axis 18 from the support surface 26. The pin member 36 is axially moveable relative to the lower die 22. The pin member 36 is elongate along the axial direction and has four portions 38–42. Each portion (e.g., 38) has a circular cross section.

The first portion 38 of the pin member 36 is located within the second, lower portion 32 of the bore 28 of the lower die 22. The first portion 38 provides a flange for the pin member 36 and has a radius slightly less than the radius of the lower portion 32 of the die bore 28. An axial extent of the first (e.g., flange) portion 38 of the pin member 36 is less that the axial extent of the lower portion 32 of the die bore 28.

The second portion 40 of the pin member 36 is located within the first, upper portion 30 of the die bore 28 and also extends into the lower portion 32 of the die bore. The radius of the second portion 40 is less than the radius of the first portion 38. Further, the radius of the second portion 40 is slightly less than the radius of the first portion 30 of the die bore 28. The height of the first and second portions 38 and 40 of the pin member 36 are such that an upper end of the second pin portion is flush with the support surface 26 when the first pin portion is spaced away from the first portion 30 of the die bore 28. As such, the first and second portions 38 and 40 of the pin member 36 are movable along the axial direction relative to the lower die 22.

The third portion 42 of the pin member 36 extends upwardly from the support surface 26 of the lower die 22. Further, the axial extent of the third portion 42 is greater than the height of the lamina stack 12. The radius of the third portion is less than the radius of the second portion 40 of the pin member 36, and is slightly less than the radius of the lamina stack bore 14. As such, the lamina stack 12 can be places onto the pin member 36 and moved down the third portion 42 to rest the lamina stack upon the support surface 26.

The fourth portion 44 of the pin member 36 is located at an upper end of a pin member 36. The fourth portion 44 is tapered to facilitate placement of the lamina stack 12 onto the pin member 36.

A collet press assembly 50 (partially shown in FIG. 1 and completely shown in FIG. 2) of the apparatus 10 is movable as a unit relative to the support assembly 20 and the supported lamina stack 12. The collet press assembly 50 includes a plurality of collets 52. In the illustrated example, four collets 52A–52D (see FIG. 3) are provided. Each collet (e.g., 52A) is an arcuate member that extends along a 90° arc about the axis 18. As such, the four collets 52A–52D together provide a 360° extent around the axis 18. Each of the four collets 52A–52D is substantially identical. As such, only one collet (e.g., 52A) is described with the understanding that the description is generally applicable to the other collets (e.g., 52b–52D).

The collet 52A has a radially inner surface 54 that lies in an arc (i.e., is arcuate) about the axis 18. The inner surface 54 has a radius substantially identical to the radius of the outer periphery 16 of the lamina stack 12. With the radii of the collet inner surfaces 54 and the lamina stack outer periphery 16 being identical, the collets 52A–52D and the lamina stack 14 can matingly engage.

Each side face 56, 58 of the collet 52A lies along a radial line such that the collet will abuttingly mate with the two adjacent collets 52D and 52B. Recessed into each side face 56, 58 of the collet 52A is at least one spring recess 60, 62, respectively. The spring recesses 60, 62 contain compression springs 64, 66 that bias the adjacent collets away from each other. However, the compression springs 64, 66 are compressible to permit the side faces of adjacent collets to abuttingly engage.

A radially outer face of the collet 52A (FIG. 2) includes at least one radial-axially-arced, tapered surface (e.g., 70). The tapered surface (e.g., 70) is oriented such that the surface has a decreasing radius as the surface extends in an upward, axial direction. In the illustrated example, the outer face has two tapered surfaces (i.e., an upper tapered surface 70 and a lower tapered surface 72). Each tapered surface 70, 72 thus defines a quarter portion of an inverted, truncated cone. Also, in the illustrated example, a non-tapered surface 74 is located at an arc about the axis 18 between the upper and lower tapered surfaces 70 and 72.

An annular collet collar 78 (FIG. 2) of the collet press assembly 50 extends around the four collets 52A–52D. The collet collar 78 has an annular, inner bore face for engagement with the outer face of each collet (e.g., 52A). Specifically, the collet collar 78 includes an upper tapered surface 80, a non-tapered surface 82, and a lower tapered surface 84. Each tapered surface 80 and 84 bounds an inverted truncated cone portion of the collar bore, and the non-tapered surface bounds a cylindrical portion of the collar bore.

Figure 4:
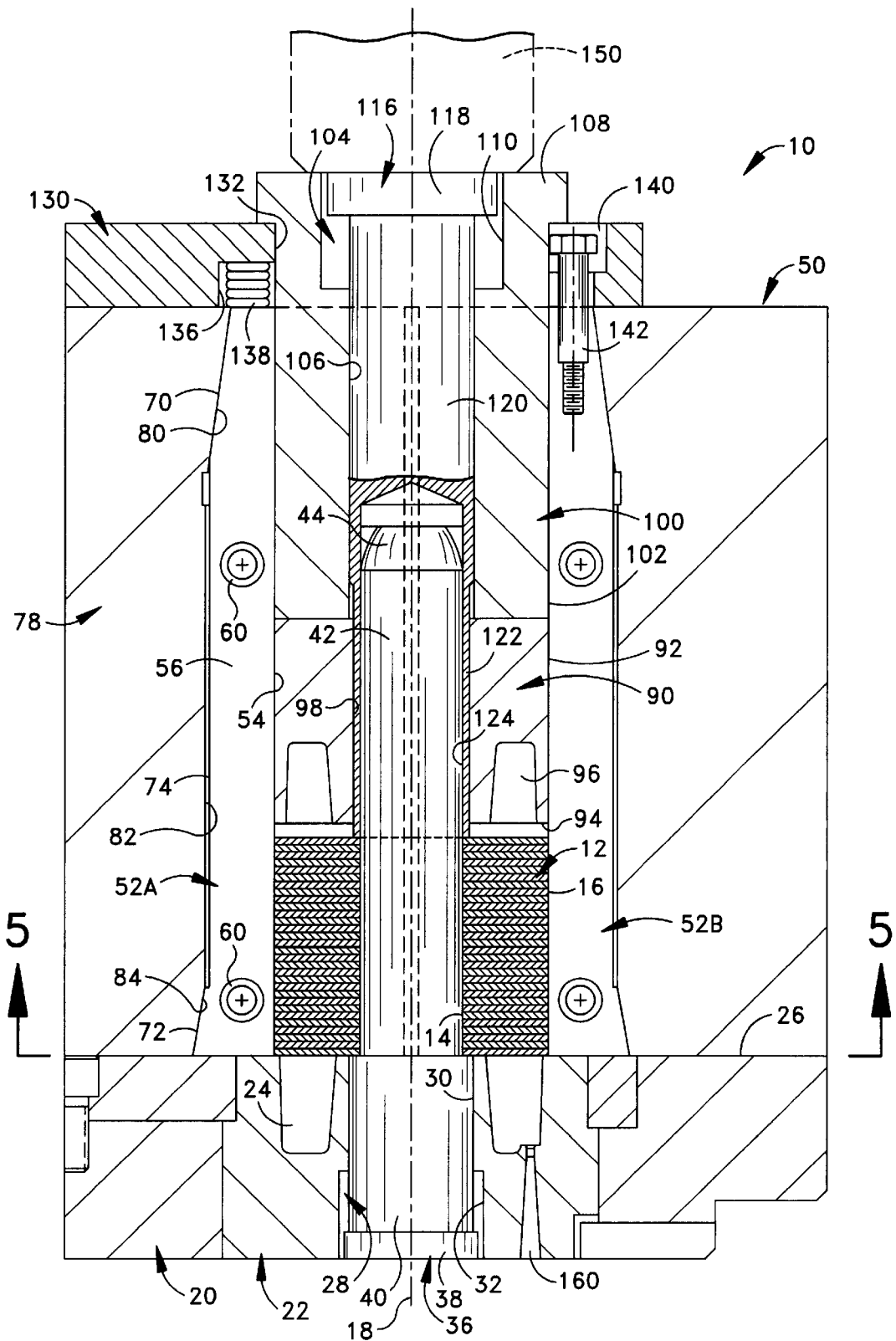
FIG. 4 is a sectional view of the apparatus of FIG. 1, and shows the apparatus in a third position.

With the collets 52A–52D within the collet collar 78, the upper tapered surfaces 70 of the collets rest against the upper tapered surface 80 of the collet collar. Also, the lower tapered surfaces 72 of the collets 52A–52D rest against the lower tapered surface 84 of the collet collar 78. The collet collar 78 is axially movable relative to the collets 52A–52D. This is shown in a comparison of FIGS. 2 and 4. In a first position shown in FIG. 2, the collets 52A–52D are biased away from each other via the compression springs 64, 66. The outer, non-tapered surfaces 74 of the collets 52A–52D rest against the non-tapered surface 82 of the collet collar 78, and the collet collar is at a location that is displaced upward relative to the collets.

During the downward axial movement of the collet collar 78 relative to the collets 52A–52D, the upper and lower tapered surfaces 80 and 84 of the collet collar slide along the respective upper and lower tapered surfaces 70 and 72 of the collets. This provides a camming action of the collets 52A–52D to move the collets radially inward (see FIG. 4). As such, the non-tapered surfaces 74 of the collets 52A–52D are moved radially inward away from the non-tapered surface 82 of the collet collar 78. Thus, the collet collar 78 provides at least a portion of a collet moving mechanism.

Within the collet press assembly 50 is an upper die 90. The upper die 90 is an annular member that extends about the axis 18 and is located within the collets 52A–52D. A radially outer surface 92 of the upper die 90 is at a radius equal to the radius of the outer periphery of the lamina stack 12. This radius is also equal to the radius of curvature of the inner surfaces 54 of the collets 52A–52D.

A lower face 94 of the upper die 90 provides a flat annular surface for engagement with an upper end of the lamina stack 12. An annular recess 96 extends into the upper die 90 from the lower face 94 to provide a mold area adjacent to the upper end of the lamina stack 12. A bore 98 extends through the upper die 90.

Affixed to an upper end of the upper die 90 is a die press member 100. In general, the die press member 100 has a similar annular configuration as the upper die 90. For example, the die press member 100 has a portion that has an outer annular surface 102 with a radius substantially identical to the outer radius of the upper die 90. Also, the die press member 100 has a bore 104 with a lower portion 106 that has a radius slightly larger than the radius of the bore 98 of the upper die 90. At an upper end of the die press member 100, a flange portion 108 is provided. Also, toward the upper end of the die press member 100, the bore 104 has a portion 110 with a radius that is greater than the radius of the lower portion 106 of the die press member.

A plunger member 116 extends through the bore 104 of the die press member 100 and the bore 98 of the upper die 90. The plunger member 116 has a cylindrical first portion 118 located at an upper end with an outer radius less than the radius of the upper portion 110 of the bore 104 of the die press member 100. This first portion 118 of the plunger member 116 has an axial extent that is less than the axial extent of the upper bore portion 110 of the die press member 100. A second portion 120 of the plunger member 116 extends from the upper bore portion 110 of the die press member 100 into the lower bore portion 106 of the die press member. This second portion 120 of the plunger member 116 is cylindrical and has a radius slightly less than the radius of the lower bore portion 106 of the die press member 100.

A third portion 122 of the plunger member 116 extends from the lower bore portion 106 of the die press member 100 through the bore 98 of the upper die 90. An outer periphery of the third plunger portion 122 is cylindrical and has a radius that is slightly less than the bore radius of the upper die 90. At least the lower, third portion 122 is hollow 124. The hollow 124 of the plunger member 116 is cylindrical and has a radius slightly greater than the radius of the third portion 42 of the pin member 36. As such, the pin member 36 can extend up into the plunger member 116 during operation of the apparatus 10.

A collar press member 130 is an additional component of the collet press assembly 50. The collar press member 130 has a cylindrical bore 132. A portion of the die press member 100 beneath the flange portion 108 extends through the bore 132. The radius of the collar press bore 132 is slightly greater than the outer diameter of this portion of the die press member 100. As such, the die press member 100 is free to move through the bore 132 of the collar press member 130.

The collar press member 130 extends over at least a portion of the collet collar 78. A lower surface of the collar press member 130 is in engagement with this portion of the collet collar 78. At least one spring receptacle 136 is provided within the collar press member 130 and at least one spring 138 is provided therein. The spring 138 extends between the collar press member 130 and a collet (e.g., 52A) The spring 138 is a compression spring and biases the collets 52A–52D downward relative to the collar press member 130 and the collate collar 78.

Also, the collar press member 130 includes a retainer bolt receptacle 140. A retainer bolt 142 extends through the retainer bolt receptacle 140 and is threadingly engaged with a collet (e.g., 52B). The bolt 142 and bolt retainer receptacle 140 are configured such that the retainer bolt has a permitted amount of vertical movement relative to the collar press member 130 during axial movement of the collets 52A–52D relative to the collet collar 78 and collar press member 130. However, the bolt 142 prevents complete removal of the collet (e.g., 52B) away from the collar press member 130 and thus prevents removal of the collets 52A–25D away from the collet collar 78.

Figure 2:
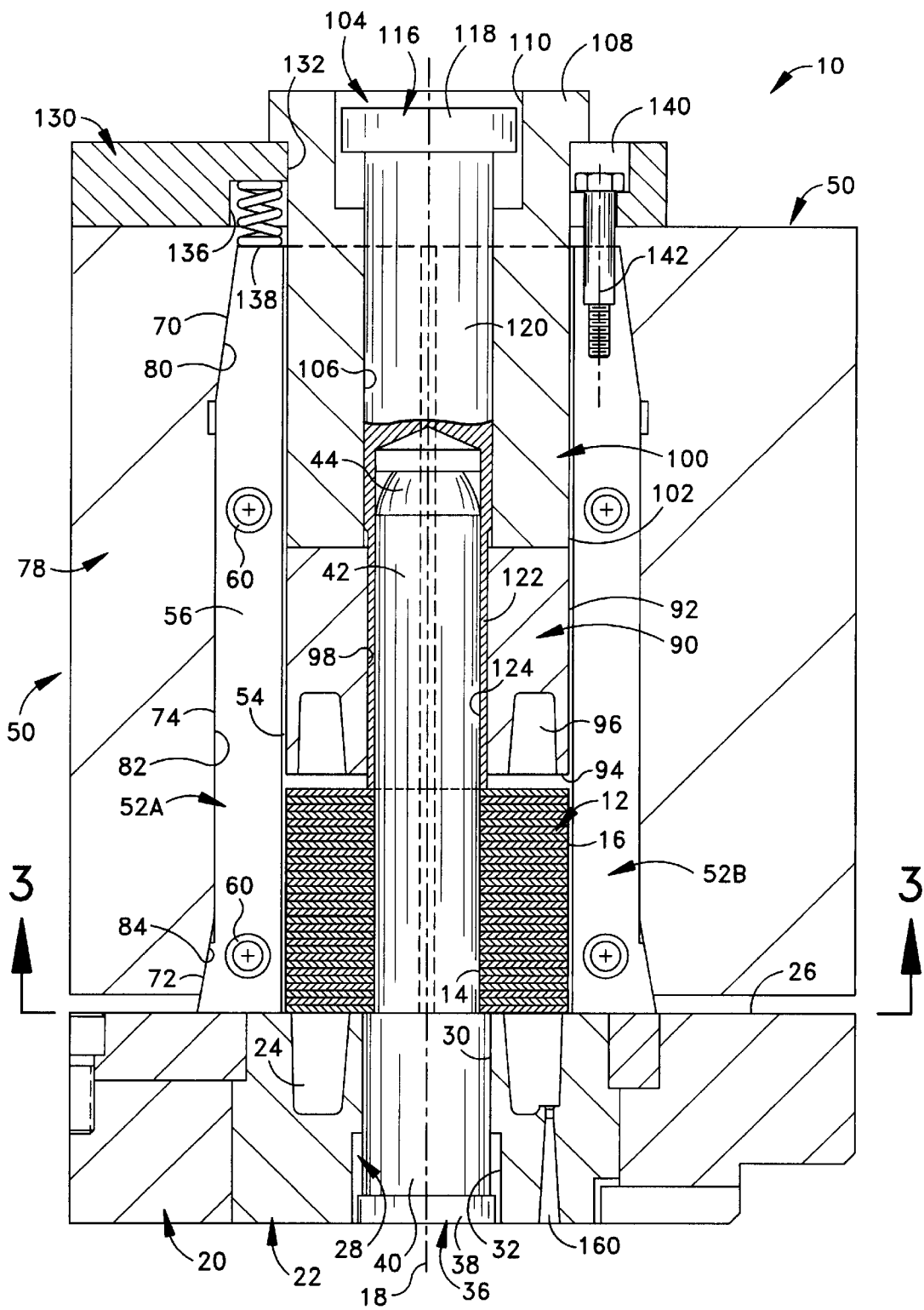
FIG. 2 is a sectional view of the apparatus of FIG. 1, and shows the apparatus in a second position.
Figure 5:
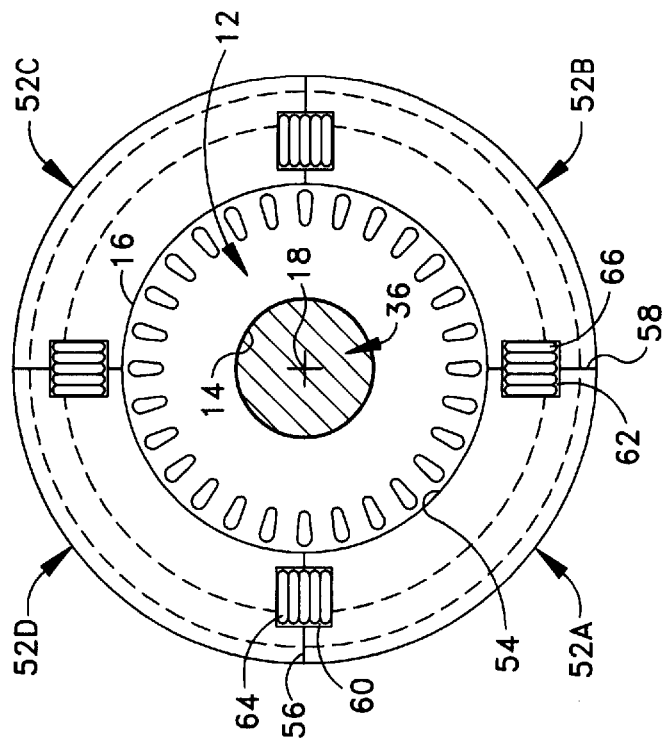
FIG. 5 is a view taken along line 5—5 in FIG. 4, with certain parts removed for clarity.
Figure 3:
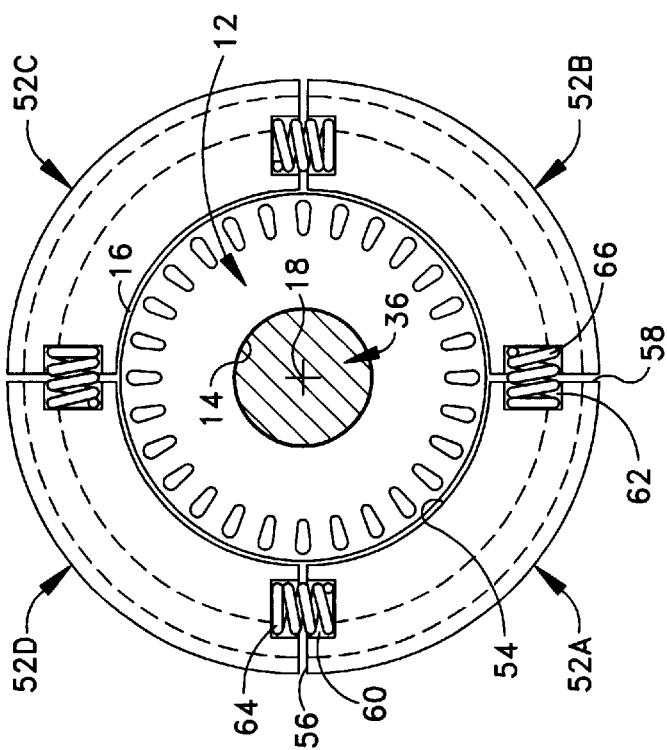
FIG. 3 is a view taken along line 3—3 in FIG. 2, with certain parts removed for clarity.

In order to make a rotor core, the lamina stack 12 is placed onto the support assembly 20 as shown in FIG. 1. The collet press assembly 50 is moved downward relative to the support assembly 20 and the lamina stack 12 as shown by the comparison if FIG. 1 and FIG. 2. Within FIG. 2, the collets 52A–52D are resting, without undue pressing forth, upon the support surface 26 of the support assembly 20 and the included lower die 22. Also, the collets 52A–52D are biased away from each other, via the compression springs 64, 66 (FIG. 3), and the collets are at a relatively downward position with regard to the collet collar 78, via the bias provided by the compression spring(s) 138 (FIG. 2).

The lamina stack 12 is enclosed within the collets 52A–52D. However, the collets 52A–52D do not yet press against the lamina stack 12. Also, the upper die 90 is not in pressing engagement against the upper end of the lamina stack 12.

In order to move the various portions of the collet press assembly 50 into final molding positions, pressing force is applied along the axial direction. Specifically, vertical downward force is applied against the die press member 100, vertical downward force is applied to the plunger member 116, and vertical downward force is applied to the collar press member 130. In response to the downward force applied to the plunger member 116, the lower extent of the plunger member is pressed against the upper end of the lamina stack 12 to press and hold the lamina stack.

In response to the downward pressing force applied to the die press member 100, the upper die 90 is urged downwardly relative to the collets 52A–52D and into pressing engagement with the upper end of the lamina stack 12. The downward pressing force provided to the plunger member 116 and the die press member 100 may be provided by a press device 150.

In response to the downward pressing force applied to the collar press member 130, the collar press member and thus the collet collar 78 are moved downwardly relative to the collets 52A–52D. The downward movement of the collet collar 78 relative of the collets 52A–52D is against the bias of the compression spring(s) 138. The downward movement occurs because the collets 52A–52D are already in engagement with the support surface 26 of the support assembly 20 whereas the lower surface of the collet collar 78 only engages the support surface 26 of the support assembly 20 after a downward movement stroke. Attendant with the downward movement of the collet collar 78, the collets 52A–52D are cammed inwardly against the bias of the springs 64, 66. The inner surfaces 54 of the collets 52A–52D press against and mate with the radially outer periphery 16 of the lamina stack 12.

As such, the lower die 22, the upper die 90, the pin member 36, the lower surface of the plunger member 116, and the collets 52A–52D contribute to provide a molding chamber arrangement within which the lamina stack 12 is located. Molten casting metal is then input (e.g., injected) into this casting area. In one example, this metal inflow is received via a conduit 160 through the lower die 22. The casting metal is permitted to cool and solidify with the collet press assembly 50 in pressing engagement with the support assembly 20. Once cooled sufficiently to solidify, the pressing force is released.

With the release of force, the collet press assembly 50 can be released from the support assembly 20 and the newly cast rotor core 166. The collet press assembly 50 is moved upwardly away from the support assembly 20. During such movement of the collet press assembly 50, the release of the pressing force will permit downward movement of the collets 52A–52D relative to the collet collar 78 and the collar press member 130. This relative movement is urged due to the bias of the compression springs 64, 66 between the collets 52A–52D and the compression spring(s) 138 between the collets the collar press member 130.

Due to the mating engagement between the collets 52A–52D and the lamina stack 12 during the molding process, no (or very little) excess metal is present on the radially outer periphery of the cast rotor core 166. Thus, no (or very little) machining, grinding, or the like is needed. Further, the rotor core has a required acceptable dimensional tolerance. As such, issues regarding degradation of dimensional tolerance and/or degradation of electrical properties caused by large scale machining, grinding, or the like do not arise.

Figure 6:
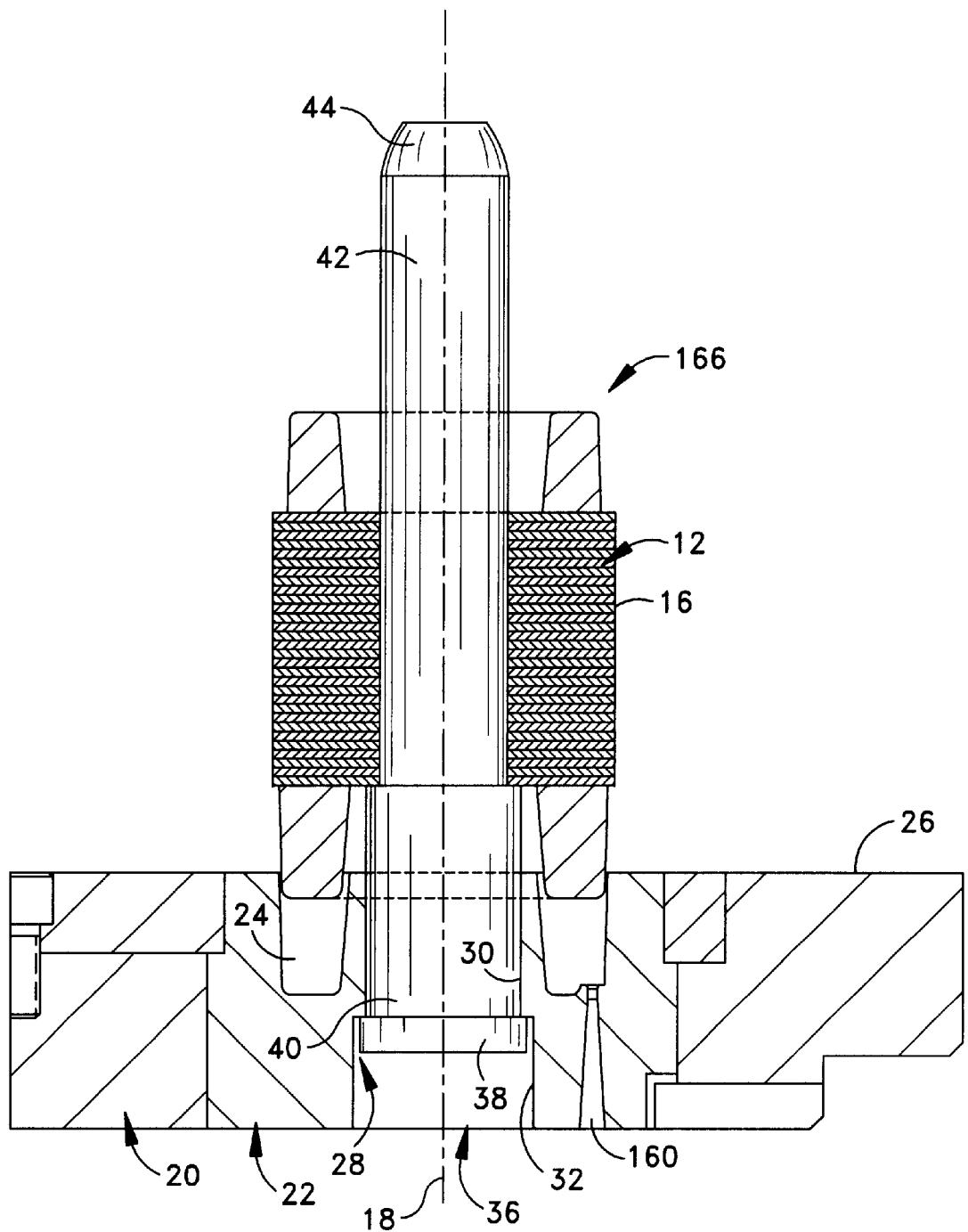
FIG. 6 is a sectional view of part of the apparatus of FIG. 1, with the apparatus in a fourth position.

As shown in FIG. 6, with the collet press assembly 50 lifted upward, away from the support assembly 20 and the newly cast rotor core 166, the rotor core can then be removed from the support assembly. This removal is aided by an upper pressing force applied to the pin member 36. This pressing force may be provided by an ejector (not shown). The upward force moves the pin member 36 upwardly relative to the remaining support assembly 20. With the second portion 40 of the pin member 36 having a radius greater than the radius of the bore 14 through the lamina stack 12, the second portion of the pin member lifts upward on the lamina stack of the rotor core 166 as the pin member moves upwardly. With the newly cast rotor core 166 in an upward, ejected position away from the remaining support assembly 20, the newly cast rotor core can be lifted upward off of the pin member 36 and completely clear of the apparatus 10.

Figure 7:
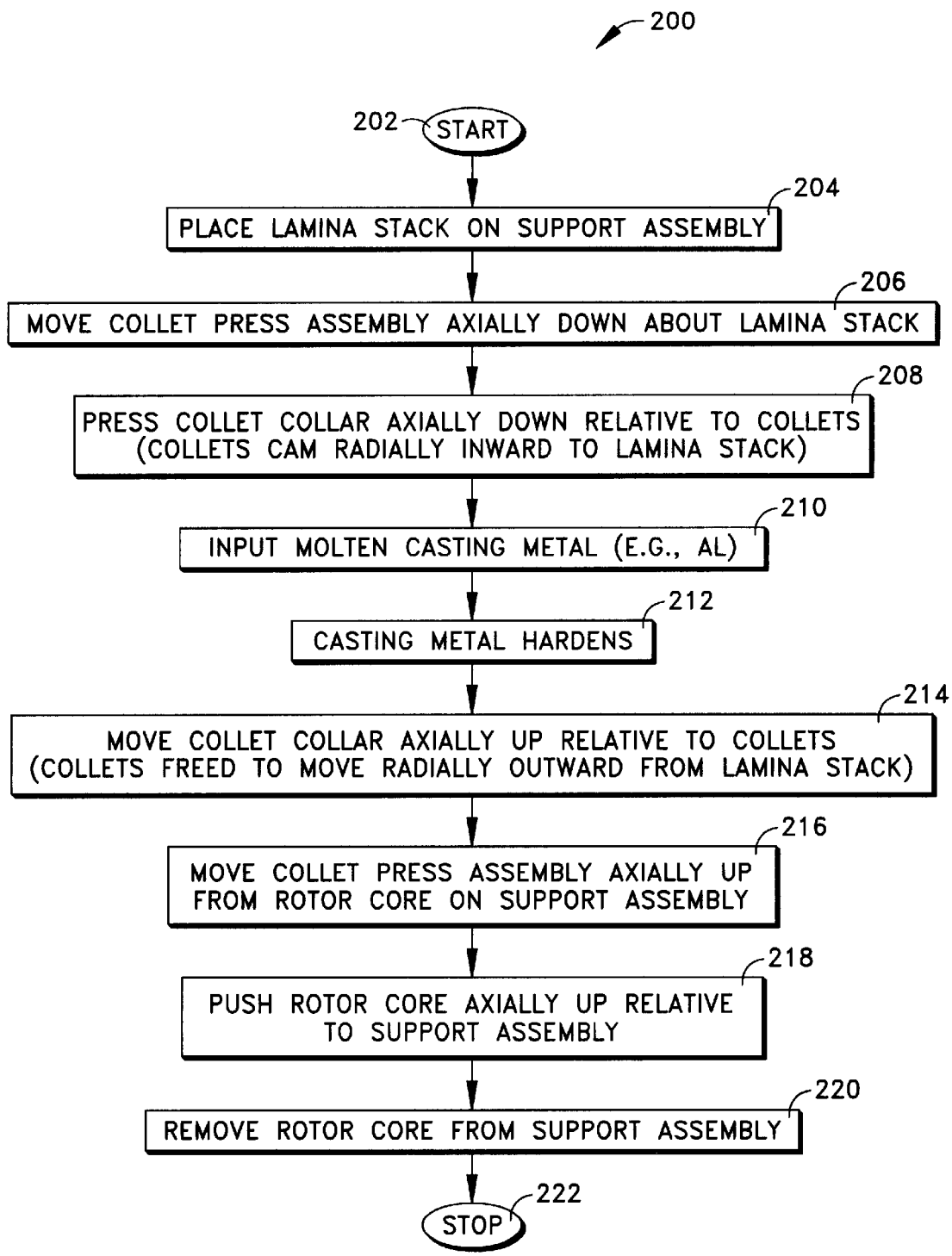
FIG. 7 is a flow chart for a method of making a rotor core in accordance with the present invention.

A flow chart for a process 200 in accordance with the present invention is shown in FIG. 7. The process 200 is initiated at step 202 and proceeds to step 204. At step 204, the lamina stack 12 is placed onto the support assembly 20. At step 206, the collet press assembly 50 is moved axially downward about the lamina stack 12.

At step 208, the collet collar 78 is pressed axially downward relative to the collets 52A–52D. As such, the collets 52A–52D cam (i.e., slide) radially inward to the lamina stack 12. Molten casting metal (e.g., aluminum) is input at step 210. At step 212, the metal hardens. The collet collar 78 is moved axially upward relative to the collets 52A–52D at step 214. As such, the collets 52A–52D are freed to move radially outward from the lamina stack 12. At step 216, the collet press assembly 50 is moved axially up away from the rotor core 166 that is located on support assembly 20. The rotor core 166 is pushed axially up relative to the support assembly 20 at step 218. At step 220, the rotor core 166 is removed from the support assembly 20 and at step 222, the process 200 is complete.

From the above description of the present invention, persons skilled in the art will perceive improvements, changes, and modifications. Such improvements, changes, and modifications within the skill of the art are intended to be covered by the appended claims.

Having described the invention, the following is claimed:

1. An apparatus for making a rotor core, the apparatus including:
   a support for supporting a lamina stack that has an axis extending along the stack;
   a plurality of collets, the collets having a taper extending along an axial direction;
   a collet moving mechanism for moving the collets radially inward against the lamina stack, the collet moving mechanism including a member that slides axially along the taper to provide a radially inward moving force; and
   an arrangement to receive casting material that is cast to the lamina stack while the collets are against the lamina stack.

2. An apparatus as set forth in claim 1, wherein the member of the collet moving mechanism is a collet collar.

3. An apparatus as set forth in claim 2, wherein the collet collar has a taper extending along an axial direction and that engages the taper of the collets.

4. An apparatus as set forth in claim 2, including means to bias the collets relative to the collet collar, against the radially inward movement of the collets.

5. An apparatus for making a rotor core, the apparatus comprising:
   a support for a lamina stack having a radially-outer surface and having therein openings, the support having an axis extending along the lamina stack;
   an inner surface movable radially inward toward the radially-outer surface of the lamina stack, the inner surface being defined by a plurality of collets each having an inner surface portion;
   a mold to receive casting material that flows into the openings in the lamina stack and that is cast to the lamina stack while the inner surface is positioned against the radially-outer surface of the lamina stack, such that the inner surface substantially prevents the casting material from flowing onto the radially-outer surface of the lamina stack; and
   a moving mechanism operable to move the inner surface radially inward to mate with the radially-outer surface of the lamina stack, the moving mechanism including a collar that slides axially along the collets.

6. An apparatus as set forth in claim 5, wherein each collet has a taper, and the collar slides axially along the taper of each collet.

7. An apparatus as set forth in claim 6, wherein the collar has a taper engageable with the taper of each collet.

8. An apparatus as set forth in claim 7, further comprising means to bias the collets relative to the collar, against movement of the collets toward the radially-outer surface of the lamina stack.

9. An apparatus for making a rotor core, the apparatus including:
   a support for supporting a lamina stack that has an axis extending along the stack;
   a plurality of collets, the collets positioned to engage the support;
   a collet moving mechanism for moving the collets radially inward against the lamina stack, the moving mechanism positioned to cam the collets radially inward when a portion of the moving mechanism moves axially toward the support; and
   an arrangement to receive casting material that is cast to the lamina stack while the collets are against the lamina stack.

* * * * *